United States Patent [19]

Mohler et al.

[11] Patent Number: 5,160,919

[45] Date of Patent: Nov. 3, 1992

[54] ERGONOMIC KEYBOARD

[76] Inventors: Jack M. Mohler, 420 N.E. 10th; Jacque L. Havice, 800 North Maple, both of Abilene, Kans. 67410

[21] Appl. No.: 579,901

[22] Filed: Sep. 10, 1990

[51] Int. Cl.[5] ............................................. G09G 3/02
[52] U.S. Cl. .................................. 340/711; 340/706; D14/100; D14/115; 341/22; 248/918; 400/489; 400/82
[58] Field of Search ................. 340/706, 711; 341/20, 341/22; 400/82, 83, 472, 479, 489; 248/918; D14/100, 106, 114, 115; 200/5 A; 225/145 R, 146; 358/254

[56] References Cited

U.S. PATENT DOCUMENTS

| | | | |
|---|---|---|---|
| 4,378,553 | 3/1983 | McCall | 341/22 |
| 4,509,210 | 4/1985 | Kohn | 358/254 |
| 4,564,751 | 1/1986 | Alley et al. | 400/473 |
| 4,597,681 | 7/1986 | Hodges | 400/488 |
| 4,661,005 | 4/1987 | Lahr | 341/20 |
| 4,680,577 | 7/1987 | Straayer et al. | 340/711 |

FOREIGN PATENT DOCUMENTS 2607126 8/1977 Fed. Rep. of Germany ...... 400/489

OTHER PUBLICATIONS

Newsweek, Aug. 20, 1990, "Casualties of the Keyboard", p. 57.
Readers Digest, Mar., 1989, "Keyboard Crippler", p. 113.
Wall Street Journal, May 23, 1990, "Computer Keyboards: Which type is Right?".
Popular Science, Sep., 1990, "Comfytyper", p. 10.

Primary Examiner—Alvin E. Oberley
Assistant Examiner—Jick Chin
Attorney, Agent, or Firm—McAndrews, Held & Malloy, Ltd.

[57] ABSTRACT

An ergonomic keyboard which allows the user's hands to be placed in an anatomically neutral position with the palms facing each other. The main keys are arranged in vertical rows on opposite sides of a base, with the keys to be engaged by the index fingers being uppermost, and the keys to be engaged by the little fingers being lowermost. Space bars are arranged on side edges of the base such that they may be activated by pressure applied from different directions. Secondary keys, such as function keys, are arranged on inclined surfaces for improved visibility. The keyboard may be a discrete unit, or may be fixed to or integral with a data display monitor.

4 Claims, 1 Drawing Sheet

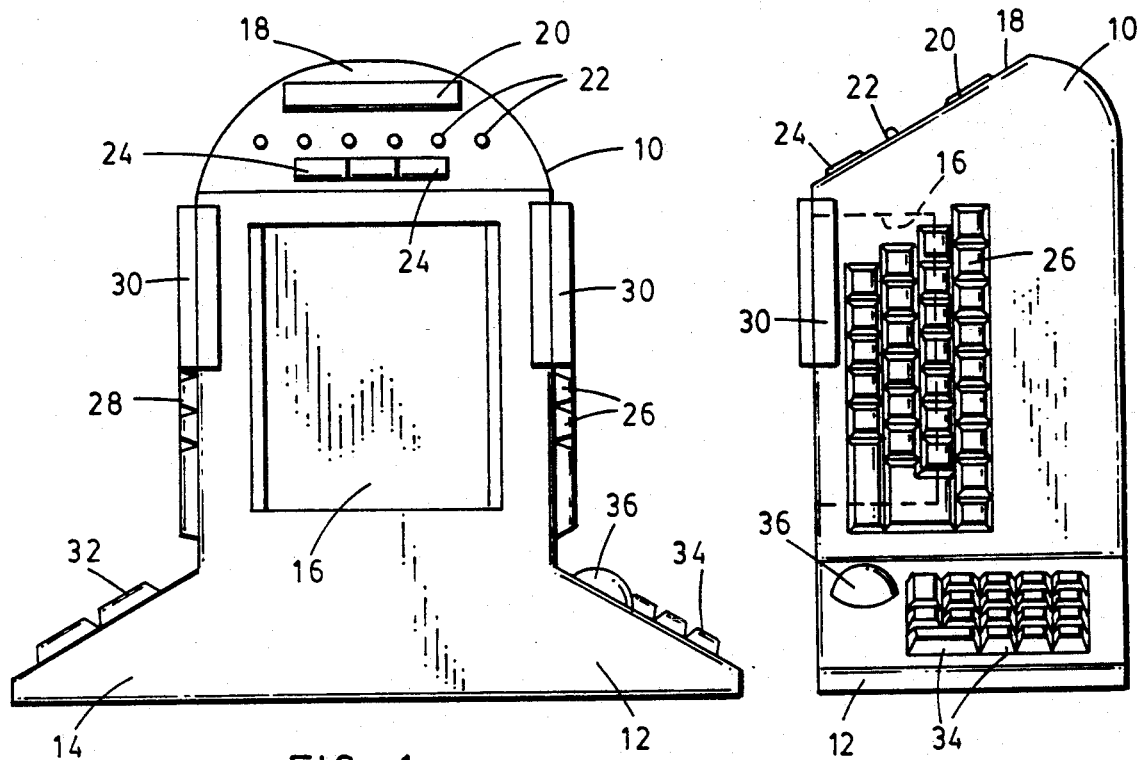
FIG. 1
FIG. 2
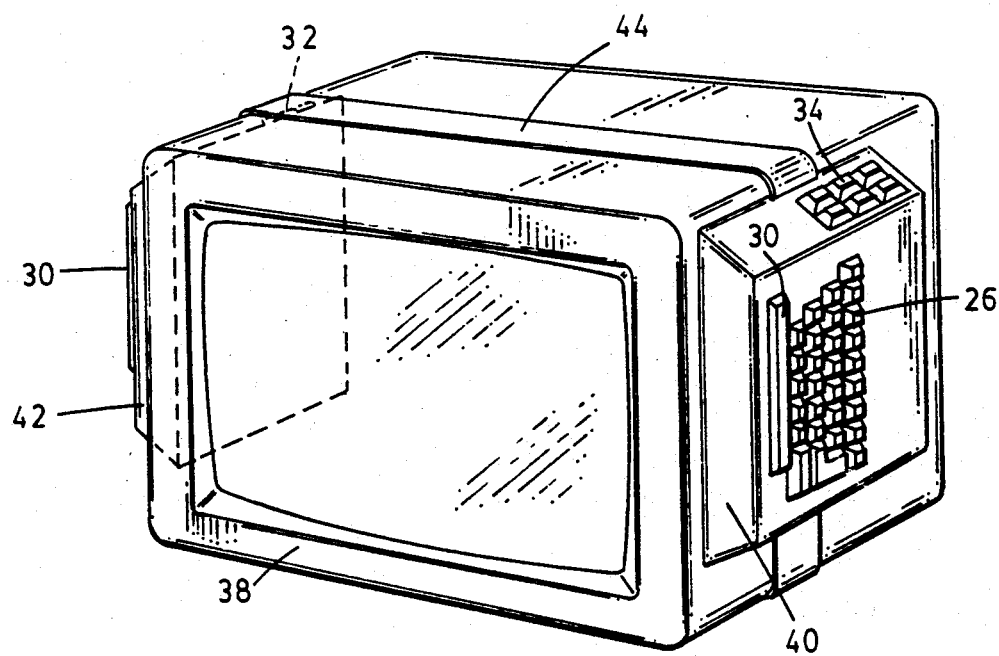
FIG. 3

ERGONOMIC KEYBOARD

BACKGROUND OF THE INVENTION

1. Field of the Invention

The present invention pertains to keyboards of the type used to manually enter information in a typewriter, computer, process machine or similar device.

2. Description of the Prior Art

The standard keyboard design for many years was the typical "QWERTY" key arrangement fixed to a typewriter. In recent years, however, the increased popularity of personal computers and computer controlled machinery has fueled changes in keyboard designs.

The vast majority of the recent design changes have been in the number of keys provided and the key layout. Keyboards for personal computers today typically include a numeric keypad, cursor control keys, dedicated special function keys and programmable special function keys, all in addition to a "QWERTY" key layout. Many variations in the relative positions of these keys over the keyboard plane are known, yet this increasing number of keys threatens to increase keyboard size to the point that size reductions in the computer proper are negated.

Relatively few changes have been made beyond the provision and placement of keys. The greatest change has been the advent of detached keyboards. Separating the keyboard from the unit with which it is used allows the user to easily place the keyboard in the position most comfortable for use. Many detached keyboards also include retractable legs for raising the edges of the keyboard furthest from the user to increase comfort in use.

Despite the ability of the detached keyboard to be placed in the position most comfortable for the individual user, discomfort often occurs. This is due to the planar layout of the keyboard, which forces the user to adopt an unnatural palms-down hand placement. Applicant believes that this keyboard design leads to various user injuries, such as carpal tunnel syndrome, tendinitis and bursitis.

OBJECTS AND ADVANTAGES

An object of the present invention is to provide a keyboard which can be operated in a manner which minimizes stress on ligaments, tendons, and bursas of the user's arms and hands.

A further object of the present invention is to provide a keyboard which can be operated by a user having hands and wrists near the anatomically neutral position.

Another object of the present invention is to provide a keyboard which can be operated by a user having hands and arms in opposition which provides good balance and control of hands and fore arms.

Yet another object of the present invention is to provide a keyboard in which the most often used keys are positioned in the most advantageous position to minimize stress on the user's hands and fore arms and to position less often used keys where they are visible to the user than the more often used keys.

A further object of the present invention is to provide a keyboard which can be mounted to existing deices to provide a keyboard which can be operated from nearly anatomically neutral positions.

It is another object of the present invention to provide a keyboard which can be operated from a nearly anatomically neutral position which can be adjusted for the comfort of individual users. It is a further object of the present invention to provide a keyboard which may decrease the incidence of repetitive use injuries.

SUMMARY OF THE INVENTION

The present invention provides a keyboard design which allows the user to adopt an anatomically neutral position for the arms and hands, and which requires little or no twisting of the wrists. Specifically, a keyboard is provided in which the keys are positioned in two spaced opposed, substantially vertical layouts such that the user may engage the keys with the palms of the hands facing each other.

The present keyboard includes a base which comprises or includes an upstanding base section. The keys of the keyboard are arranged on opposite sides of the base section, with the keys in substantially vertical rows. The base section may also include display devices, to indicate the information generated by use of the keyboard, the status of the keyboard or the status of the device the keyboard supports. Additional keys and input devices may be arranged on extensions extending outwardly from the base. These additional devices may include a numeric keypad, a set of special function keys and/or a trackball.

This arrangement allows the user to engage the keys with the hands placed in an anatomically neutral position with the palms facing each other. User comfort is improved with this arrangement and various debilitating hand conditions may possibly be avoided.

BRIEF DESCRIPTION OF THE DRAWINGS

The various aspects of the invention are described in detail below, with reference to the drawings, in which:

FIG. 1 is a front elevation view of a keyboard according to the present invention.

FIG. 2 is a side elevation view of the keyboard of FIG. 1.

FIG. 3 is a perspective view of a keyboard according to the present invention adapted and mounted to a monitor.

In the following description, spacial orienting terms, such as right, left, front, and back, are used. These terms are used for ease of description only and not in themselves structurally limiting or requiring an exact location in space.

DETAILED DESCRIPTION OF THE INVENTION

A first embodiment of the keyboard of the invention is shown in FIG. 1 and FIG. 2. The keyboard includes a main body 10 which has the general form of a pillar or column. As shown in FIG. 1 the main body 10 includes right and left foot extensions 12 and 14, respectively. The foot extensions, which are located at the lower end of the main body 10, increase the stability of the main body. Located within the main body 10 is a recess 16. The recess 16 in front 15 may be used as a personal storage area, storage for office supplies, or may house additional controls or equipment, such as dictation equipment.

The upper end of the main body 10 includes a display face 18. The display face 18 faces the user of the keyboard, and is inclined for easy viewing. Located on the display face are various indicators. Numeral 20 references a small screen which may display messages regarding the status of the system or display the information which the user has typed in while using the keyboard. Screen 20 may be an LCD screen similar to those commonly used on smart" typewriters, or any other type of screen which may display information. A series of indicator lights 22 are also located on the face 18, and may indicate system status. Finally, display face 18 includes a second series of indicator lights 24, which may indicate the operating status of the keyboard by illuminating when the number lock, caps lock or scroll lock are engaged.

The layout of the keys is best shown by taking FIGS. 1 and 2 in conjunction. As shown, the main keys are arranged on right side 17 and left side 19 of the main body 10. In particular, a right hand set of main keys 26 are located on the right side 17 of the body 10, and a left hand set of main keys 28 are located on the left side 19 of the body 10. The layout of the right main keys 26 shown in FIG. 2 corresponds to the layout of those keys which would be engaged with the right hand in a standard "QWERTY" keyboard, with the exception that the keys are arranged substantially vertically, with those keys engaged by the index finger being uppermost, and those keys engaged by the little finger being lowermost. The layout of left main keys 28 is analogous, and corresponds to those keys which would be engaged by the left hand in the "QWERTY" system, with those keys engaged by the index finger being uppermost, and those keys engaged by the little finger being lowermost.

A pair of bar-type keys that function as space bars 30 are located on the main body 10 at right front edge 21 and left front edge 23 thereof closest to the user, and are also oriented substantially vertically. The placement of the space bars along the edges facilitates their ability to be engaged in numerous ways. For example, each space bar could be activated by pressure applied to the outermost face 44 thereof in a manner similar to a space bar in a standard keyboard. Such pressure could be applied by the user's thumb. Alternatively, each space bar could be activated by pressure applied to a side face 46 thereof. If the thumb were resting on the side face 46 of the space bar closest to the user, the space bar would be activated by moving the thumb toward the hand. These methods of activation are not exclusive. Pressure applied to an oblique face oriented between outermost face 44 and side face 46 would have the effect of simultaneously applying pressure to outermost face 44 and side face 46, thereby activating the space bar.

It should be evident from the foregoing that the attitude of the hands of the user when using the keyboard of the present invention is very different from the attitude when a typical keyboard is used. The present keyboard allows the user to enter information with the hands in an anatomically neutral position with the palms facing each other. Specifically, when using the present keyboard the hands of the user are midway between pronation (palm down) and supination (palm up). The right and left hand keys are spaced apart so that there is approximately 10 to 20 degrees of dorsiflexion of the wrist. The thumb is in partial opposition and forward.

This is a natural position for the wrists and hands, and is essentially their position if the arms are allowed to hang relaxed and then the elbows bent halfway. The preferred position of the user's arms while using the keyboard is also natural. The upper arms should hang naturally at the user's sides. The elbows should be bent such that the forearms are substantially parallel to the ground. Thus, the primary movements when using the keyboard will be in the elbows and fingers, rather than the wrist.

The distance between the left and right hand sets of primary keys (as viewed in FIG. 1) may be minimal to reduce space requirements or may be approximately the width of the user's shoulders. A standard width which will accommodate the average user may be used, several widths may be produced or the keyboard may be made adjustable in this dimension. While any means allowing adjustment of the width may be used, a particular example is to form each of the sets of primary keys as a separate unit which may be slidably (in the width direction) received in the main body 10. The spacing of the separate units could then be effected by the use of a pin extending from each of the separate units into appropriately inclined slots in a plate, such that movement of the plate with a control knob would cause sliding of the separate units to the desired width.

While the above description of the position of the hands is certainly preferred, it is acknowledged that a compromise position may be necessary for many users. This is due to the fact that the visibility of the keys in their preferred position is quite low. This will produce problems for those users who are not touch-typists. For this reason it may be necessary to form the right and left sides of main body 10 with a slight inclination from vertical (as viewed in FIG. 1), such that the visibility of the keys is improved. This may also be accomplished by forming the main body as a dome, rather than a pillar.

For those keys which are seldom used, and therefore less susceptible to touch-typing, visibility is especially important. It is for this reason that the keyboard shown in FIGS. 1 and 2 includes secondary keys located on the foot extensions 12 and 14. A set of left hand secondary keys 32 is shown on the upper inclined surface of the left foot extension 14. The left secondary keys 32 may include dedicated and programmable special function keys common to standard computer keyboards. The upper inclined surface of the right foot extension 12 includes a set of right hand secondary keys 34. The right secondary keys 34 may form a numeric keypad. The right foot extension 12 may also include a trackball 36 which may be used for cursor/pointer control in computer software which supports the use of a mouse.

It is to be understood that the use of inclination in the key layout is a compromise, and is not preferred. Thus, the angle of inclination shown in FIG. 1 is not controlling. In fact, the smallest amount of inclination which still allows efficient use of the keys should be used. This may even result in the secondary keys 32 and 34 and the trackball 36 being mounted on the respective sides of main body 10. In such a situation, the foot extensions 12 and 14 may be omitted.

A second embodiment of the keyboard of the present invention is shown in FIG. 3. For simplicity, elements equivalent to those in the first embodiment are indicated with like reference numerals.

In this embodiment, the keys are arranged for use in an atomically neutral position as in the first embodiment, but the keys are arranged on the sides of a visual display monitor. The placement of the monitor between the keys spaces the keys to, or near, the proper width. However, in this embodiment, there is no possibility that the space between the sets of keys is wasted. The space between the sets of keys is effectively utilized for the display device, and may thus be considered as an emphasis on, and enlargement of, the screen 20 in the first embodiment.

The particular arrangement of the keyboard shown in FIG. 3 is that of an add-on accessory. Specifically, an existing monitor 38 has a right hand key support 40 and a left hand key support 42 attached thereto. The key supports 40 and 42 may be attached to the monitor 38 in numerous ways, including adhesives or the use of a strap or bracket 44. If such an arrangement is used, any conduits (e.g., electrical or light) necessary to connect the key supports may be integral with, or attached to, the strap or bracket 44.

The arrangement of the keys on the key supports is analogous to that in the first embodiment. A right hand set of main keys 26 are located on the outer, substantially vertical face of the right hand key support 40. Similarly, a left hand set of main keys 28 are located on an outer, substantially vertical, face of the left hand key support 42. A space bar 30 is also located on each of the key supports. As in the previous embodiment, the space bars extend substantially vertically, are located on the edges of the key supports closest to the user and may be activated by pressure applied from more than one direction to outermost face 44 or oblique face 45. It should be noted that, while the space bars and rows of keys extend substantially vertically, they may be at an angle with respect to the screen of the monitor. This is because the monitor may be tilted upward slightly to face the user more directly.

The secondary keys may also be used with this embodiment. A left hand set of secondary keys 32 is located on an upper inclined face of the left key support 42, and a right hand set of secondary keys 34 is located on an upper, inclined face of right hand key support 40. Although not shown, a trackball may also be placed on either of the key supports. The placement of the secondary sets of keys on the upper portion of the key supports is merely exemplary, as these sets of keys may also be placed on extensions extending from the lower portions of the key supports, in a manner similar to the first embodiment.

The key supports need not be an add-on accessory. The housing for the monitor may simply include the key supports integrally. The key supports may be formed on the sides of the monitor as shown in FIG. 3, or may be formed on extensions of the monitor housing which extend toward the user. As with the first embodiment, the key supports, whether add-on or integral, may be provided with means (e.g., cams, pin and inclined slot, threadedly adjustable legs) for adjusting the width distance between the key supports, and may be placed at an incline for improved visibility.

Finally, it should be stressed that the main focus of the present invention is placement of the keys such that an anatomically neutral position is maintained during use. The particular arrangement of the keys is therefore not limited to the "QWERTY" arrangement used in the above description, but may be a Dvorak or any other type of arrangement. Similarly, while the above description has been with reference to keys activated by pressure, keys manually activated by other means, including heat, are encompassed.

As many modifications of the disclosed keyboard are possible, it is to be understood that the disclosed embodiments are merely examples thereof, and that the invention includes all modifications, embodiments and equivalents thereof falling within the scope of the following claims.

What is claimed is:

1. A keyboard apparatus for use by a person to manually input of information to a computer, typewriter or other keyboard operated device comprising in combination,
   an upstanding unitary main body defining a generally vertical right side, a generally vertical left side separated from the right side by a distance that allows the person to simultaneously place each hand on the side of the main body nearest the hand, the right side being closer to the person's right hand and the left side being closest to the person's left hand, the right side and the left side having upper extents generally horizontally opposed to each other and extending downwardly from the upper extends to lower extents that are generally horizontally opposed to each other, the main body further defining a base portion extending between the lower extent of the right side and the lower extent o the left side, the base portion extending outwardly from the lower extent of the right side defining a right foot extension of the main body having a right secondary surface extending outwardly and downwardly from the lower extent of the right side and the base portion extending outwardly from the lower extent of the left side defining a left foot extension of the main body having a left secondary surface extending outwardly and downwardly from the lower extent of the left side, the base portion defining a flat bottom generally perpendicular to the sides and extending below the entire base portion, the main body further defining a display surface extending across the upper extents of the right side and the left side and oriented to be easily viewed by a person operating the keyboard;
   a plurality of keys mounted to the right side and a plurality of keys mounted to the left side the keys being the type that are activated by application of a force to the key in a direction toward the side to which the key is mounted; and
   a plurality of information display devices mounted to the display face; whereby a person may operate the keyboard with each hand positioned midway between pronation and supination adjacent to a side of the keyboard and the person may view the information display devices while operating the keyboard.

2. The keyboard apparatus of claim 1 wherein the left secondary surface and the right secondary surface extend outwardly from the main body to allow a person operating the keyboard to view the surfaces and further comprising a plurality of secondary keys mounted to the right secondary surface and a plurality of secondary keys mounted to the left secondary surface, the keys being the type that are activated by application of a force to the key in a direction toward the surface to which the key is mounted whereby a person operating the keyboard may view the secondary surfaces while operating the keyboard and may view the secondary surfaces while operating the keyboard and may activate a secondary key by viewing the key and lowering a hand from a position adjacent to a side to the secondary surface to which the secondary key is mounted.

3. The keyboard apparatus of claim 2 wherein the main body defines a front extending between the sides and a recess extending into the front.

4. A keyboard apparatus for use by a person to manually input information to a computer, typewriter or other keyboard operated device comprising in combination:

- a main body forming a generally vertical column having a right side and a left side spaced apart from the right side, the right side having a right front edge and the left side having a left front edge, the right side, the left side, the right front edge, and the left front edge being substantially vertical and separated by a distance that allows the person to simultaneously place a hand on the side of the main body nearer the hand, the right side being closer to the person's right hand, the left side being closer to the person's left hand, and the front edges being edges of the sides nearest to the to the person's body;
- the main body having a front extending between the right front edge and the left front edge and a display face extending across upper extents of the right side and the left side from an upper extent of the front and the main body is sized to allow a person to view the display face while operating the keyboard;
- the main body further having a base portion adjacent to lower extents of the sides including a generally flat bottom surface;
- a right bar-type key positioned along the right front edge that is activated by application of a force in a direction along the right side, a force in a direction toward the right side, and a force along a direction generally perpendicular to the right front edge between the direction along the right side and the direction toward the right side;
- a plurality of right-side keys that are activated by application of a force in a direction toward the right side and are positioned on the right side adjacent to the right bar-type key at a distance from the right bar-type key that allows the person to activate the right-side keys using the fingers of the right hand with the thumb of the right hand contacting the right bar-type key;
- a left bar-type key positioned along the left front edge that is activated by application of a force in a direction along the left side, a force in a direction toward the left side, and a force along a direction generally perpendicular to the left front edge between the direction along the left side and the direction toward the left side;
- a plurality of left-side keys that are activated by application of a force in a direction toward the left side and are positioned on the left side adjacent to the left bar-type key at a distance from the left bar-type key that allows the person to activate the left-side keys using the fingers of the left hand with the thumb of the left hand contacting the left bar-type key;
- a right foot extension extending outwardly from the right side from the base portion and a left foot extension extending from the left side from the base portion, each extension including a secondary surface extending outwardly from the adjacent side and downwardly toward the bottom surface providing a right secondary surface and left secondary surface having one or more secondary keys mounted on each secondary surface;
- whereby the person may operate the keyboard apparatus with each hand in an anatomically neutral position by placing each hand adjacent to a side of the keyboard apparatus in a position that the person feels most comfortably allows the fingers of the hand to activate the side keys and the thumb may activate the bar-type key by any movement toward the bar-type key, the secondary keys may be viewed by the person operating the keyboard, and each foot extension enhances stability by enlarging the bottom surface.

* * * * *